(12) United States Patent
Wallace

(10) Patent No.: US 11,052,964 B2
(45) Date of Patent: Jul. 6, 2021

(54) BICYCLE FRAME ASSEMBLY

(71) Applicant: Clark A. Wallace, St. Thomas (CA)

(72) Inventor: Clark A. Wallace, St. Thomas (CA)

(*) Notice: Subject to any disclaimer, the term of this patent is extended or adjusted under 35 U.S.C. 154(b) by 260 days.

(21) Appl. No.: 16/262,130

(22) Filed: Jan. 30, 2019

(65) Prior Publication Data

US 2020/0062333 A1 Feb. 27, 2020

(30) Foreign Application Priority Data

Aug. 24, 2018 (CA) ................................ CA 3015256

(51) Int. Cl.
*B62K 19/18* (2006.01)
*B62K 25/28* (2006.01)
*B62K 25/26* (2006.01)
*B62K 25/04* (2006.01)

(52) U.S. Cl.
CPC .............. *B62K 25/26* (2013.01); *B62K 19/18* (2013.01); *B62K 25/286* (2013.01); *B62K 2025/048* (2013.01)

(58) Field of Classification Search
CPC .. B62K 25/26; B62K 2025/048; B62K 19/00; B62K 19/06; B62K 19/18; B62K 25/28; B62K 25/286
USPC ...................................... 280/284, 283, 281.1
See application file for complete search history.

(56) References Cited

U.S. PATENT DOCUMENTS

| | | | |
|---|---|---|---|
| 4,613,146 A * | 9/1986 | Sharp | B62K 3/02 280/288.2 |
| D491,111 S * | 6/2004 | Mizuta | D12/111 |
| 6,880,847 B2 | 4/2005 | Chamberlain et al. | |
| 7,052,028 B2 | 5/2006 | Chamberlain | |
| 7,052,029 B2 | 5/2006 | Chamberlain | |
| 7,059,620 B2 | 6/2006 | Chamberlain | |

(Continued)

FOREIGN PATENT DOCUMENTS

| GB | 2284396 A | * | 6/1995 | ............. B62K 25/26 |
|---|---|---|---|---|
| GB | 2454021 A | * | 4/2009 | ........... B62K 25/286 |

OTHER PUBLICATIONS

Risser Racing, "Frames & Links," Internet Archive Wayback Machine, Oct. 18, 2005, <https://web.archive.org/web/20051018172604/http://www.risserracing.com/product_frames.shtml>.

*Primary Examiner* — Ruth Ilan
*Assistant Examiner* — Myles A Harris
(74) *Attorney, Agent, or Firm* — Hartman Global IP Law; Gary M. Hartman; Domenica N.S. Hartman

(57) ABSTRACT

There is provided a bicycle assembly including a front frame portion having at least one front frame support member. The bicycle assembly also includes a rear frame portion having at least one upper rear frame support member and at least one lower rear frame support member. At least one junction member is removably coupled with the front frame support member, the junction member having a lower frame member coupling end portion and an upper frame member coupling end portion. The lower rear frame support member is coupled with the lower frame member coupling end portion. The upper rear frame support member is coupled with the junction member between the lower frame member coupling end portion and the upper frame member coupling end portion. There is thereby provided a modular bicycle frame assembly wherein components may be removed and replaced to accommodate user biomechanics and terrain aspects.

24 Claims, 8 Drawing Sheets

(56) References Cited

U.S. PATENT DOCUMENTS

| | | | |
|---|---|---|---|
| 7,377,535 B2 | 5/2008 | Chamberlain | |
| 7,506,528 B2 | 3/2009 | Chamberlain | |
| 7,520,522 B2 | 4/2009 | Julliard et al. | |
| 7,658,394 B1* | 2/2010 | Huang | B62K 25/26 |
| | | | 280/284 |
| 7,934,739 B2 | 5/2011 | Domahidy | |
| 7,938,424 B2* | 5/2011 | Arraiz | B62K 25/286 |
| | | | 280/284 |
| 8,272,658 B2* | 9/2012 | Hoogendoorn | B62K 25/286 |
| | | | 280/284 |
| 8,590,914 B2 | 11/2013 | Domahidy | |
| 9,045,191 B2* | 6/2015 | Yasuda | B62K 19/30 |
| 9,623,931 B2* | 4/2017 | Emura | B62M 9/04 |
| 9,845,132 B2* | 12/2017 | O'Connor | B62K 25/286 |
| 10,737,742 B2* | 8/2020 | Soncrant | B62L 1/005 |
| 10,850,796 B2* | 12/2020 | Chamberlain | B62K 25/10 |
| 2003/0042702 A1* | 3/2003 | Chen | B62K 25/28 |
| | | | 280/283 |
| 2003/0227156 A1* | 12/2003 | Morita | B62K 3/10 |
| | | | 280/283 |
| 2005/0057018 A1* | 3/2005 | Saiki | B62K 25/286 |
| | | | 280/284 |
| 2006/0197306 A1* | 9/2006 | O'Connor | B62K 25/30 |
| | | | 280/284 |
| 2009/0146391 A1* | 6/2009 | Sutherland | B62K 19/08 |
| | | | 280/287 |
| 2012/0013101 A1* | 1/2012 | Huang | B62K 19/08 |
| | | | 280/287 |
| 2012/0074666 A1* | 3/2012 | Chamberlain | B62K 25/20 |
| | | | 280/284 |
| 2013/0093160 A1* | 4/2013 | Alsop | B62K 25/286 |
| | | | 280/284 |
| 2014/0042726 A1* | 2/2014 | Canfield | B62K 25/30 |
| | | | 280/284 |
| 2014/0265208 A1* | 9/2014 | Voss | B62K 25/28 |
| | | | 280/210 |
| 2015/0069735 A1* | 3/2015 | Hoogendoorn | B62K 25/28 |
| | | | 280/284 |
| 2017/0021888 A1* | 1/2017 | Hastie | B29C 43/52 |
| 2017/0355416 A1* | 12/2017 | Gauthier | B62K 19/30 |
| 2019/0300097 A1* | 10/2019 | Chamberlain | B62K 25/26 |

* cited by examiner

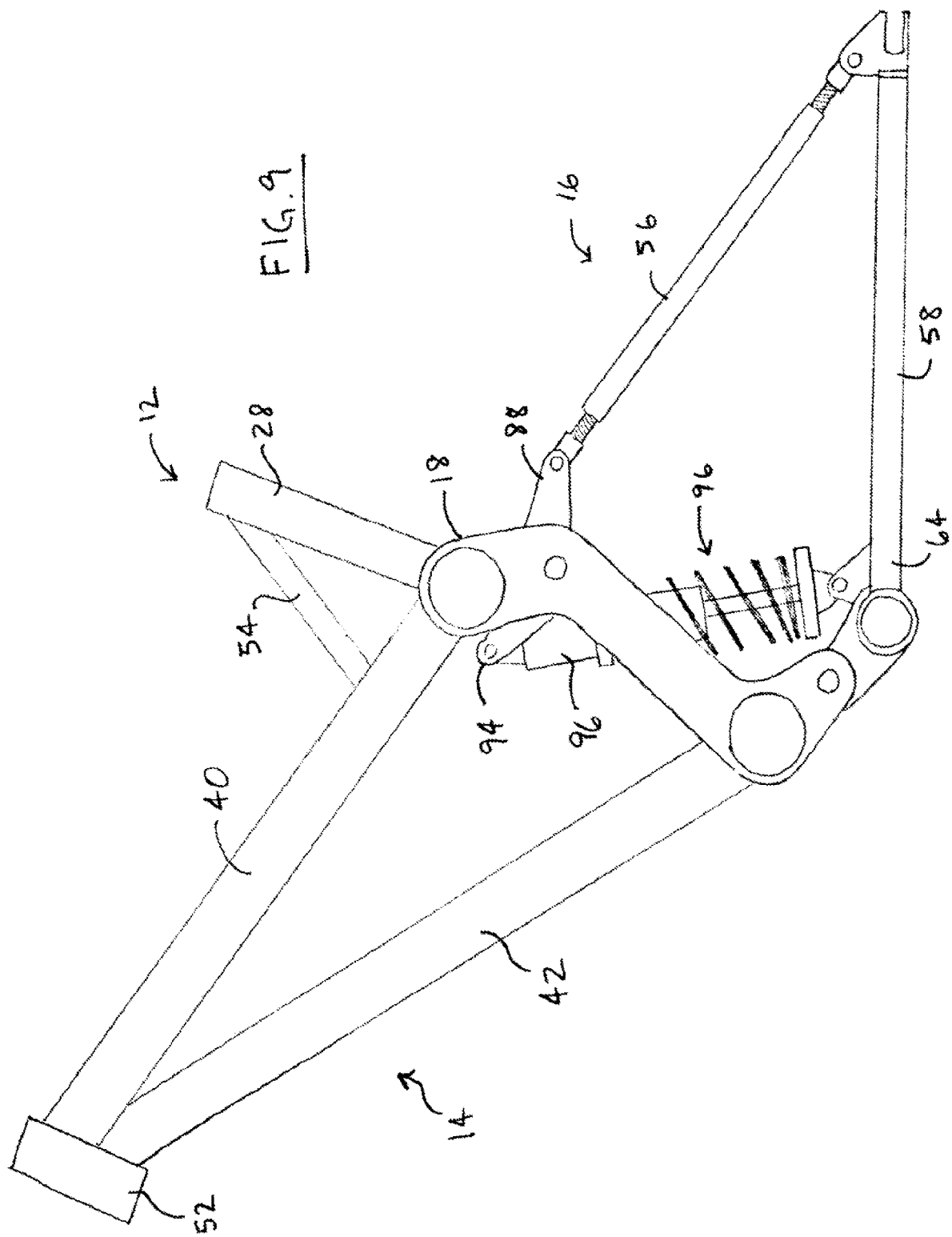

BICYCLE FRAME ASSEMBLY

FIELD OF THE INVENTION

The present invention relates to bicycle frames and more particularly relates to bicycle frames of modular construction.

BACKGROUND

Cycling is a sport enjoyed in various types of terrain and by many people. Bicycles can be configured in various ways to accommodate travel over different types of terrain or to accommodate the biomechanical needs of a rider or their personal preferences.

The sport of off-road bicycle riding has evolved to a more advanced level, with terrain becoming more varied and extreme in its geographical proportions. As a result, manufacturers are designing machines that are more proficient in handling these extreme terrains by focusing on wheel path characteristics, suspension actuation methods and wheel sizes. One aspect that has been overlooked is the relationship of the rider to the bicycle and the performance advantages available when the physical characteristics of a bicycle can be readily modified to achieve an optimal ergonomic relationship between its operator and the specific terrain being traveled on. There are considerable performance advantages to be found by enabling the frame of the bicycle to change its physical proportions for different terrain applications as well as different rider proportions and preferences.

Bicycle frames are rigid structures which generally are of a monolithic design having a front frame portion with a steering assembly for controlling a front wheel and a rear frame portion with a rear wheel and gear hub assembly. The frame of the bicycle is typically fixed in its construction and in some cases is welded together with a size and geometry suited to fit the biomechanical needs of a rider or to suit the terrain on which the bicycle will be ridden or a combination of both. Once assembled, the size and geometry of the frame cannot be changed easily and readily and cannot be customized without modifying the frame in a manner which is potentially permanent or which would be difficult to reverse. However, when the intended use of the bicycle varies, a change in the size and the geometry of the frame portions may be desired. For example, a bicycle adapted for travel over rocky terrain such as mountains or trails would include a suspension assembly and a frame geometry suited for efficient travel over that terrain. However, a rider may use the same bicycle for travel over other terrain. When it is desired to travel over smoother terrain such as city roads, more efficient travel would be provided by a different frame with a geometry better suited for that terrain. However, due to the generally fixed construction of bicycle frames, a bicycle made for rocky terrain cannot easily be modified for efficient city road use. Thus, either the user must endure less efficient travel when using their bicycle over terrain for which it is not specifically designed or two different bicycles will be needed. Purchasing additional bicycles can come at relatively high cost.

Elements of a bicycle frame may require replacement when broken or worn. Addressing such issues may necessitate replacement of the entire bicycle frame. Also, the body of the user may change in size or weight over time. In such instances, there is a change in the biomechanics of the user in relation to the bicycle frame. In either the case of replacement of the frame due to wear or breakage or due to changes in the biomechanics of the user, the whole bicycle may need to be replaced. Also, two different users often cannot share use of the same bike while enjoying equally effective travel as the frame is fixed in size and geometry.

Therefore, there is a need for adjusting a bicycle frame to different terrain and for customizing it to different users or to the same user to accommodate for changes in size or changes in biomechanics. It would also be desirable to provide a bicycle frame in which worn or broken component parts may be replaced without having to replace the entire bicycle frame.

BRIEF DESCRIPTION

The present invention relates to bicycle frames and more particularly relates to bicycle frames of modular construction.

One general aspect includes a bicycle assembly including: a front frame portion having at least one front frame support member. The bicycle assembly also includes a rear frame portion having at least one upper rear frame support member and at least one lower rear frame support member. The bicycle assembly also includes at least one junction member removably coupled with the at least one front frame support member, the at least one junction member having a lower frame member coupling end portion and an upper frame member coupling end portion, wherein the at least one lower rear frame support member is coupled with the lower frame member coupling end portion and wherein the at least one upper rear frame support member is coupled with the at least one junction member between the lower frame member coupling end portion and the upper frame member coupling end portion. Preferably, the at least one front frame support member includes at least one upper front frame support member and at least one lower front frame support member. The junction member is preferably removably coupled with the at least one upper front frame support member and the at least one lower front frame support member.

The at least one upper rear frame support member may include a pair of upper rear frame support members. Moreover, each of the upper rear frame support members may be an extendable strut. The at least one upper rear frame support member may be directly coupled with the at least one junction member. The at least one upper rear frame support member may be non-pivotably coupled with the at least one junction member.

In another aspect, the bicycle assembly further includes at least one linking member. The at least one linking member has a body portion and a first end portion extending from the body portion. The first end portion is coupled with an end portion of the at least one upper rear frame support member and the body portion of the at least one linking member is coupled with the at least one junction member. The at least one junction member may be non-pivotably coupled with the body portion of the at least one linking member and the at least one lower rear frame support member.

In another aspect, the bicycle assembly further includes at least one linking member having a body portion, a first end portion extending from the body portion and a second end portion extending from the body portion away from the first end portion. The first end portion is pivotably coupled with an end portion of the upper rear frame support member and the body portion of the at least one linking member is pivotably coupled with the at least one junction member. The at least one lower rear frame support is also pivotably coupled with the at least one junction member.

A suspension assembly may extend between the second end portion of the at least one linking member and at least one of the front frame portion, the rear frame portion and the lower frame member coupling end portion of the junction member. The suspension assembly may extend between the second end portion of the at least one linking member and at least one of an upper front frame support member end portion, a lower front frame support member end portion, an upper rear frame support member end portion, a lower rear frame support member end portion and the lower frame member coupling end portion of the junction member.

In another aspect, the at least one junction member further includes a pair of junction members each removably coupled with the at least one front frame support member and the at least one lower rear frame support member. One of the at least one lower rear frame support member and the junction members of the pair of junction members sandwiches the other one of the lower rear frame support member and the junction members of the pair of junction members.

In another aspect, the at least one junction member further includes a pair of junction members. The upper frame member coupling end portion of each junction member of the pair of junction members is removably coupled with the at least one upper front frame support member wherein one of the at least one upper front frame support member and the upper frame member coupling end portions of the junction members sandwiches the other one of the at least one upper front frame support member and the upper frame member coupling end portions of the junction members. The lower frame member coupling end portion of each junction member of the pair of junction members is removably coupled with the at least one lower front frame support member wherein one of the at least one lower front frame support member and the lower frame member coupling end portions of the junction members sandwiches the other one of the at least one lower front frame support member and the lower frame member coupling end portions of the junction members. Each of the junction member lower frame member coupling end portions may also be coupled with the at least one lower rear frame support member wherein one of the lower frame member coupling end portion and the at least one lower rear frame support member sandwiches the other one of the lower frame member coupling end portion and the at least one lower rear frame support member.

The bicycle assembly may further include a pair of linking members each having a body portion pivotably coupled with a respective junction member of the pair of junction members. A first end portion extends from each of the body portions and a second end portion extends from each of the body portions away from the first end portion. The assembly includes a pair of upper rear frame support members each pivotably coupled with the first end portion of a respective linking member of the pair of the linking members and the at least one lower rear frame support member is pivotably coupled with the at least one junction member.

A suspension assembly may extend from the second end portions of the pair of linking members to at least one of the front frame portion, the rear frame portion and the lower frame member coupling end portion of the junction member. In another aspect, the suspension assembly extends between the second end portions of the pair of linking members and at least one of an upper front frame support member end portion, a lower front frame support member end portion, an upper rear frame support member end portion, a lower rear frame support member end portion and the lower frame member coupling end portion of the junction member.

In another aspect, there is provided a junction member assembly having an upper frame member coupling end portion and a lower frame member coupling end portion, wherein at least one front frame support member of a bicycle front frame portion is removably couplable with at least one of the upper frame member coupling end portion and the lower frame member coupling end portion, at least one lower rear frame support member of a bicycle rear frame portion is removably couplable with the lower frame member coupling end portion, and at least one upper rear frame support member of a bicycle rear frame portion is removably couplable with the at least one junction member between the upper frame member coupling end portion and the lower frame member coupling end portion. The lower frame member coupling end portion may be removably couplable with at least one lower front frame support member of a bicycle frame front frame portion and the upper frame member coupling end portion may be removably couplable with at least one upper front frame support member of a bicycle frame front frame portion. The junction member assembly may include a pair of junction members.

In another aspect, there is provided a bicycle front frame portion having at least one front frame support member having a first end portion for removable coupling with at least one of an upper frame member coupling end portion and a lower frame member coupling end portion of a junction member of a bicycle frame assembly.

In another aspect, the bicycle frame front frame portion includes at least one upper front frame support member having a second end portion for removable coupling with an upper front frame support member coupling portion of the junction member of a bicycle frame assembly. The at least one front frame support member is at least one lower front frame support member coupled with the at least one upper front frame support member and the first end portion is for removable coupling with a lower front frame support member coupling portion of the junction member of the bicycle frame assembly.

In another aspect, there is provided a bicycle rear frame portion having at least one upper rear frame support member having a first end portion for removable coupling with a coupling portion of a junction member of a bicycle assembly between an upper frame member coupling end portion of the junction member and a lower frame member coupling end portion of the junction member. The bicycle rear frame portion further includes at least one lower rear frame support member having a second end portion for removable coupling with the lower frame member coupling end portion of a junction member of the bicycle frame. The first end portion of the at least one upper rear frame support member may be for removable coupling with an end portion of a linking member for extending between the first end portion of the at least one upper rear frame support member and the upper frame member coupling end portion of the junction member of the bicycle frame. The second end portion of the lower rear frame support member may be for pivotable coupling with the lower frame member coupling end portion of the junction member of the bicycle frame.

BRIEF DESCRIPTION OF THE DRAWINGS

FIG. 9 is a side view of the bicycle frame assembly according to one aspect of the present invention.

DETAILED DESCRIPTION

The present invention relates to bicycle frames and more particularly relates to bicycle frames of modular construction.

Figure 1:
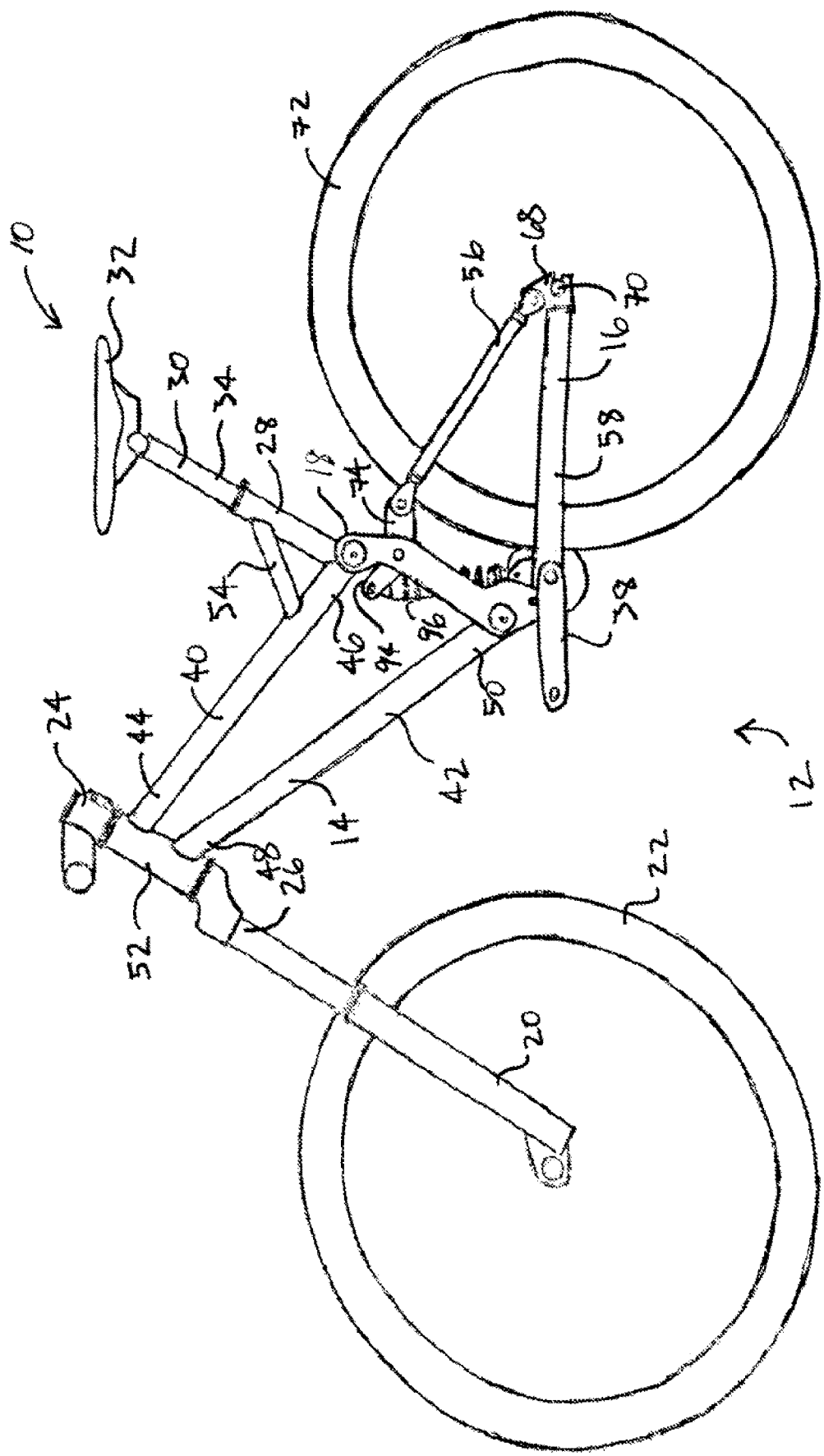
FIG. 1 is a side view of an exemplary bicycle according to one aspect of the present invention.

With reference to FIG. 1, there is provided an exemplary bicycle 10 including a bicycle frame assembly 12. Bicycle frame assembly 12 includes a front frame portion 14, a rear frame portion 16, and at least one junction member 18.

Bicycle 10 further includes a front fork portion 20 for coupling with a front wheel assembly 22. A handlebar assembly 24 is coupled with the front fork portion 20 at an upper end portion 26 thereof. The handle bar assembly 24 is for rotating the front wheel assembly 22 to control the direction of travel. Bicycle 10 further includes a seat assembly receiving portion 28 extending upwardly from the front frame portion 14. A seat assembly 30 having a seat 32 and a seat support member 34 is received and supported by the seat assembly receiving portion 28. Bicycle 10 further includes a rear wheel assembly 36 coupled with the rear frame portion 16. The rear wheel assembly 36 may include a gear hub (not shown) which is rotated by a chain (not shown) for rotating the rear wheel assembly 36 to provide drive in the direction of travel. A pedal assembly 38 may be rotatably coupled with the bicycle frame assembly 12. Pedal assembly 38 may be coupled with the front frame portion 14 or the rear frame portion 16 or may be coupled therebetween.

Figure 2:
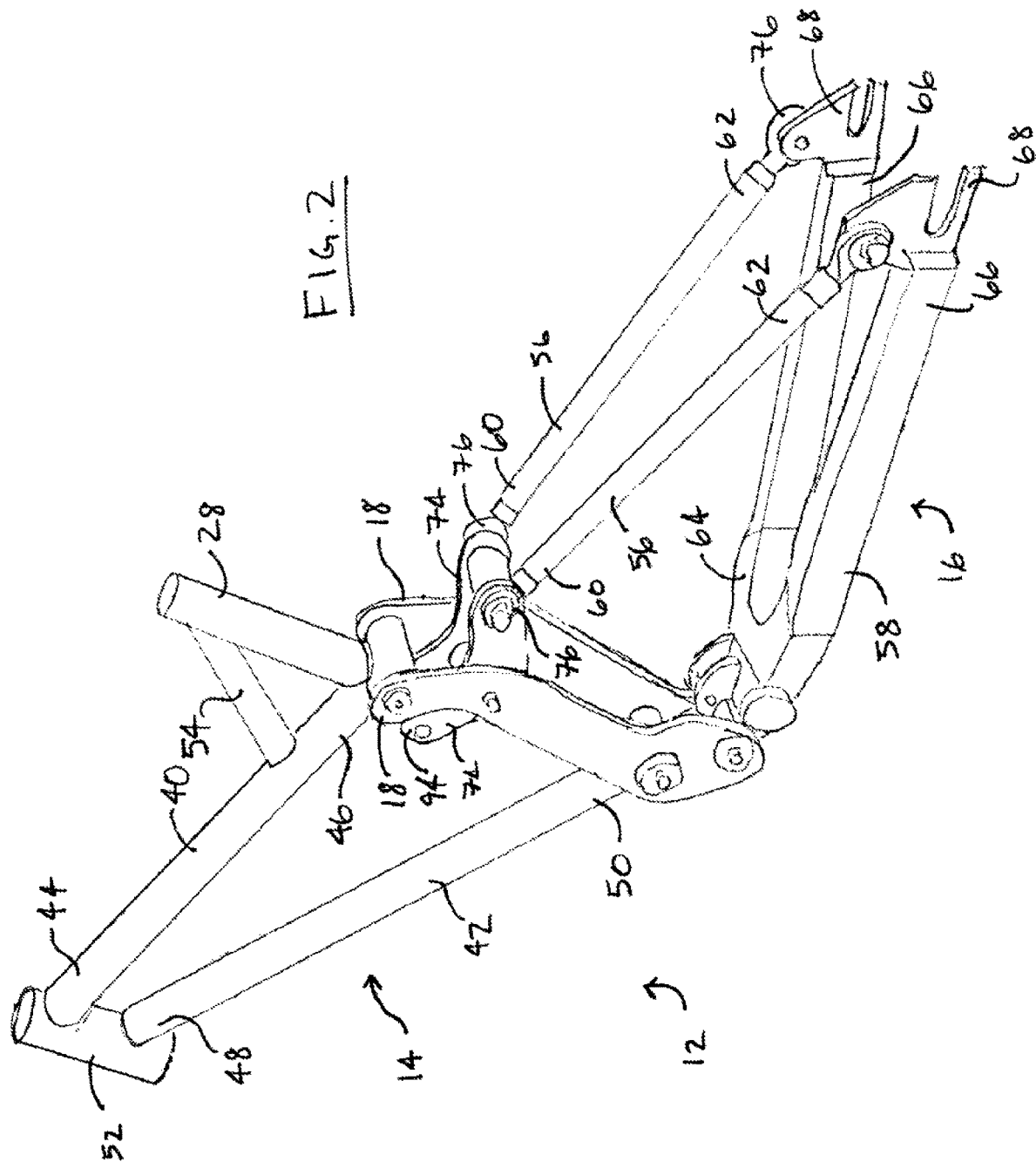
FIG. 2 is a perspective view of a bicycle frame assembly according to one aspect of the present invention.

With further reference to FIG. 2 it can be seen that the front frame portion 14 of the bicycle frame assembly 12 preferably includes an upper front frame support member 40 and a lower front frame support member 42. The upper front frame support member 40 has a first end portion 44 and a second end portion 46 and the lower front frame support member 42 has a first end portion 48 and a second end portion 50. The first end portion 44 of the upper front frame support member 40 and the first end portion 48 of the lower front frame support members 42 are connected with a head member or head tube 52 from which the front fork portion 20 of the bicycle 10 depends. The second end portion 46 of the upper front frame support member 40 is coupled with the seat assembly receiving portion 28. Additionally, a strut 54 may extend angularly between the upper front frame support member 40 and the seat assembly receiving portion 28 to provide additional support for the seat assembly receiving portion 28.

Although the aspect shown in FIG. 2 includes a front frame portion 14 having an upper front frame support member 40 and a lower front frame support member 42, it should be understood that the front frame portion 14 may include as few as one front fame support member.

The rear frame portion 16 of the bicycle frame assembly 12 includes at least one upper rear frame support member 56 and at least one lower rear frame support member 58. Preferably, the rear frame portion 16 includes a pair of upper rear frame support members 56. Each upper rear frame support member 56 has a first end portion 60 and a second end portion 62 and each lower rear frame support member 58 has a first end portion 64 and a second end portion 66. In one preferred aspect, the lower rear frame support member 58 may bifurcate between the first end portion 64 and the second end portion 66 thereof so as to provide for two second end portions 66. The two second end portions 66 of the lower rear frame support member 58 may each have a rear wheel assembly receiving portion 68 for receiving an axle 70 of a rear wheel assembly 72, as shown in FIG. 1. The second end portion 62 of each of the upper rear frame support members 56 may couple with the second end portion 66 of a respective one of the lower rear frame support members 58. Such a coupling may be by any suitable fashion, such as, for example, by way of a suitable mechanical fastener. Alternatively, the second end portion 62 of each of the upper rear frame support members 56 may be integral with the second end portion 66 of a respective one of the lower rear frame support members 58, as shown in FIG. 4.

Figure 3:
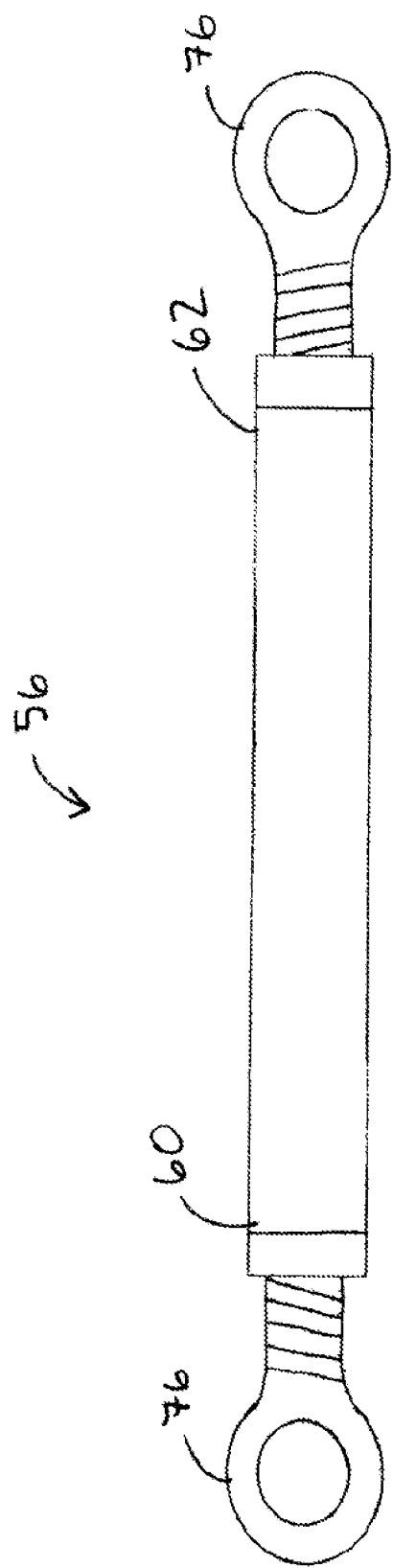
FIG. 3 is side view of an extendable strut.

In one preferred aspect, the upper front frame support member 40, the lower front frame support member 42, the at least one upper rear frame support member 56 and the at least one lower rear frame support member 58 are tubular in their construction and are preferably fabricated from a resilient material such as aluminum or carbon fiber. It should be further understood that these members may not necessarily be tubular but may be formed in any suitable shape. As shown in FIG. 3, for example, upper rear frame support member 56 may include an extendable strut. In this aspect, first end portion 60 and second end portion 62 each have extending therefrom a fastener portion 76. Each fastener portion 76 may be extendably coupled with the respective end portion 60, 62 of extendable strut 56. Such a coupling may be, for example, a threaded engagement therewith. By way of such an extendable coupling, the length of the strut 56 may be adjusted to accommodate rear frame portions having different distances between the junction member 18 and the rear wheel assembly receiving portion 68.

The first end portion 60 of each upper rear frame support member 56 and the first end portion 64 of each lower rear frame support member 58 is coupled with the junction member 18. In the aspect shown in FIGS. 1, 2 and 6, junction member 18 is coupled with each upper rear frame support member 56 indirectly via a linking member 74 or 74' as will be explained further hereinafter. In another aspect, as shown in FIG. 4, junction member 18 is coupled with each upper rear frame support member 56 directly. Moreover, the coupling between the junction member 18 and each upper rear frame support member 56 may be pivotable or non-pivotable.

Figure 4:
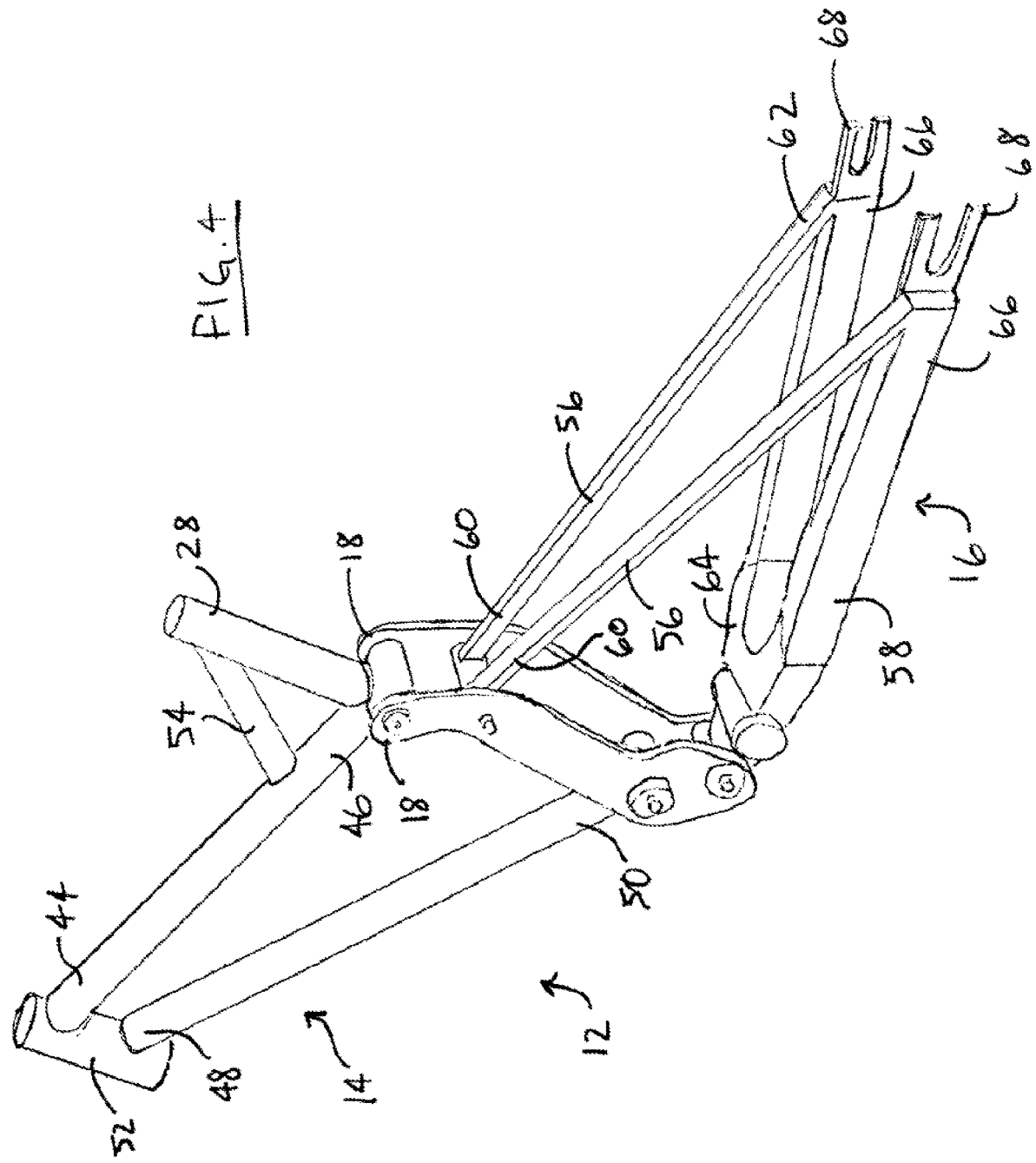
FIG. 4 is a perspective view of a bicycle frame assembly according to one aspect of the present invention.
Figure 5:
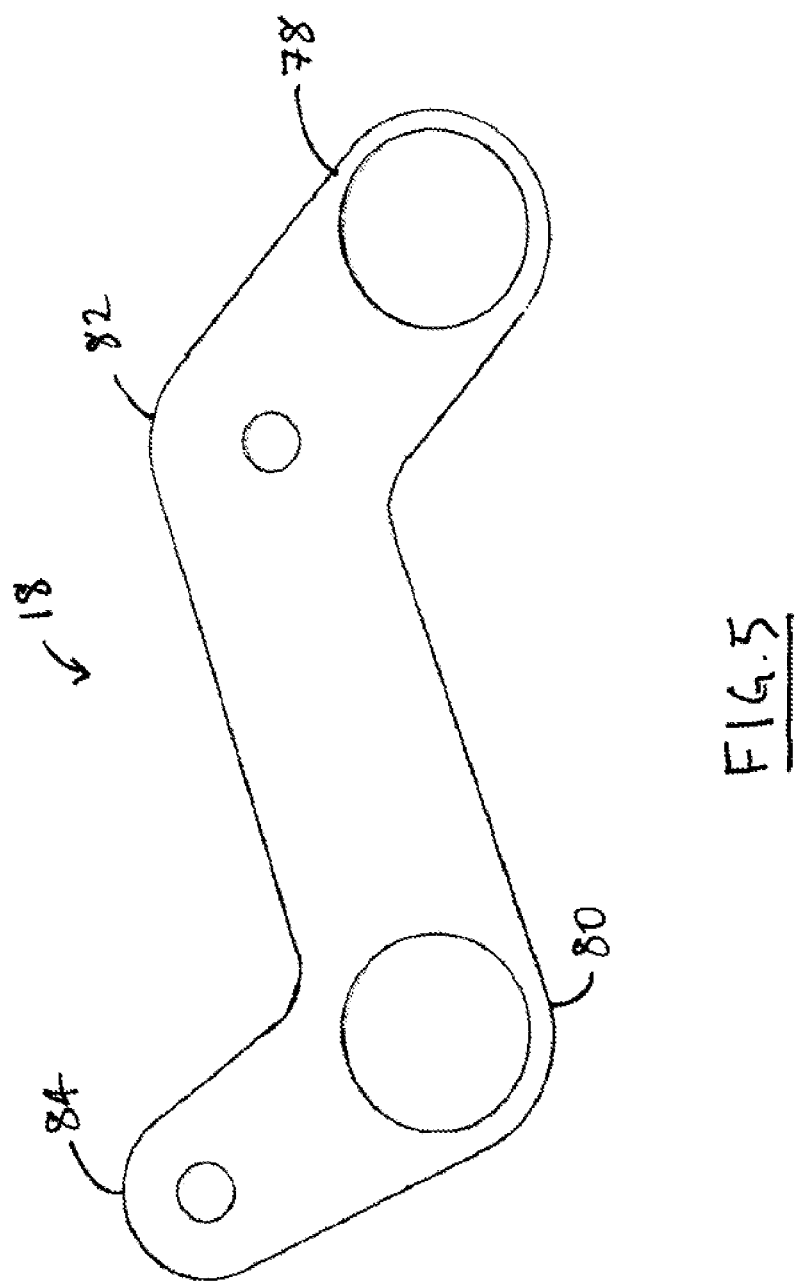
FIG. 5 is a side view of a junction member.

The bicycle frame assembly 12 further includes at least one junction member 18 as shown in FIGS. 1, 2 and 4 and which is shown in further detail in FIG. 5. The at least one junction member 18 as is generally "S-shaped" or "Z-shaped" but may in other aspects take any suitable form. The at least one front frame support member of the front frame portion 14 is removably coupled with the at least one junction member 18. As previously described, the at least one front frame support member of the front frame portion 14 preferably includes an upper front frame support member 40 and a lower front frame support member 42 and the upper front frame support member 40, the lower front frame support member 42 and the at least one lower rear frame support member 58 are removably coupled with the at least one junction member 18. The at least one upper rear frame support member 56 is coupled with the at least one junction member 18 between the at least one upper front frame support member 40 and the at least one lower front frame support member 42.

As shown in FIGS. 2 and 4, the at least one junction member 18 preferably includes a pair of junction members 18. Each junction member 18 of the pair of junction members 18 preferably includes an upper frame member coupling end portion 78 which is coupled with the upper front frame support member 40 such that the second end portion 46 thereof is sandwiched between the upper front frame support member coupling portions 78 of the pair of junction members. Each junction member 18 of the pair of junction members 18 includes a lower frame member coupling end portion 80 which is coupled with the lower front frame support member 42 preferably such that the second end portion 50 thereof is sandwiched between the lower front frame support member coupling portions 80 of the pair of junction members 18. The upper front frame support member 40 and the lower front frame support member 42 may be coupled with the at least one junction member 18 in any suitable fashion. One suitable example would be by way of a shoulder screw type fastener. Another would be a tongue-in-slot or "male-female" type connection between components wherein one of the support members 40, 42 includes a projection extending therefrom such as a "tongue" and the at least one junction member 18 has a slot projecting at least partially therethrough for receiving the projection or "tongue" therein. The tongue-in-slot type connection provides further advantage wherein two components may be readily decoupled from one another without the use of a separate tool for removing a fastener. It should be understood that other types of fastener or connection between components may also be suitable.

It should be further understood that in the aspect wherein the front frame portion 14 includes only one front frame support member, the at least one junction member 18 may include only one front frame support member coupling portion rather than an upper frame member coupling end portion 78 and a lower frame member coupling end portion 80. Moreover, although the second end portion 46 of the upper front frame support member 40 is described as being sandwiched between the upper frame member coupling end portions 78 of the pair of junction members, it should be further understood that in another aspect, the second end portion 46 of the upper front frame support member 40 may instead sandwich the upper frame member coupling end portions 78 of the pair of junction members 18. Such an arrangement may be accomplished, for example, wherein the second end portion 46 of the upper front frame support member 40 is bifurcated and the upper frame member coupling end portions 78 are received therein. Similarly, although the second end portion 50 of the lower front frame support member 42 is described as being sandwiched between the lower frame member coupling end portions 80 of the pair of junction members, it should be further understood that in another aspect, the second end portion 50 of the lower front frame support member 42 may instead sandwich the lower frame member coupling end portions 80 of the pair of junction members 18. Such an arrangement may be accomplished, for example, wherein the second end portion 50 of the lower front frame support member 42 is bifurcated and the lower frame member coupling end portions 80 are received therein.

In one aspect, as shown in FIG. 4, the pair of upper rear frame support members 56 is rigidly coupled with the pair of junction members 18 such that each upper rear frame support member 56 pair of upper rear frame support members 56 is rigidly coupled with a respective junction member 18 of the pair of junction members 18 at an upper rear frame support member coupling portion 82 thereof. Preferably, the upper rear frame support member coupling portion 82 is located generally between the second end portion 46 of the upper front frame support member 40 and the second end portion 50 of the lower front frame support member 42 when coupled with the junction member 18 or, more specifically, generally between the upper frame member coupling end portion 78 and the lower frame member coupling end portion 80 of junction member 18. The term "between" as used in relation to the position of the upper rear frame support member coupling portion 82 is not intended to imply that the upper rear frame support member coupling portion 82 is located on an imaginary line between the upper frame member coupling end portion 78 and the lower frame member coupling end portion 80, although this may be the case. The position of the upper rear frame support member coupling portion 82 may deviate from such an imaginary line in some instances. Preferably the coupling between the pair of upper rear frame support members 56 and the pair of junction members 18 is a non-pivotable coupling. Such a direct coupling may be provided by way of any suitable fastener such as, for example, a pin or a bolt and nut connection. The lower rear frame support member 58 is also coupled with the pair of junction members 18. Preferably, the first end portion 64 of the lower rear frame support member 58 is sandwiched between lower frame member coupling end portions 80 of the pair of junction members 18. The lower rear frame support member 58 may be coupled with the at least one junction member 18 in any suitable fashion. One suitable example would be by way of a shoulder screw type fastener. Another would be a tongue-in-slot type connection between components wherein one of the support members 40, 42 includes a projection extending therefrom such as a "tongue" and the at least one junction member 18 has a slot projecting at least partially therethrough for receiving the projection or "tongue" therein. The tongue-in-slot type connection provides further advantage wherein two components may be readily decoupled from one another without the use of a separate tool for removing a fastener. It should be understood that other types of fastener or connection between components may also be suitable.

Although the first end portion 64 of the lower rear frame support member 58 is described as being sandwiched between the lower frame member coupling end portions 80 of the pair of junction members 18, it should be understood that in another aspect, the first end portion 64 of the lower rear frame support member 58 may instead sandwich the lower frame member coupling end portions 80 of the pair of junction members 18. Such an arrangement may be accomplished, for example, wherein the first end portion 64 of the lower rear frame support member 58 is bifurcated and the lower frame member coupling end portion 80 is received therein.

Figure 6:
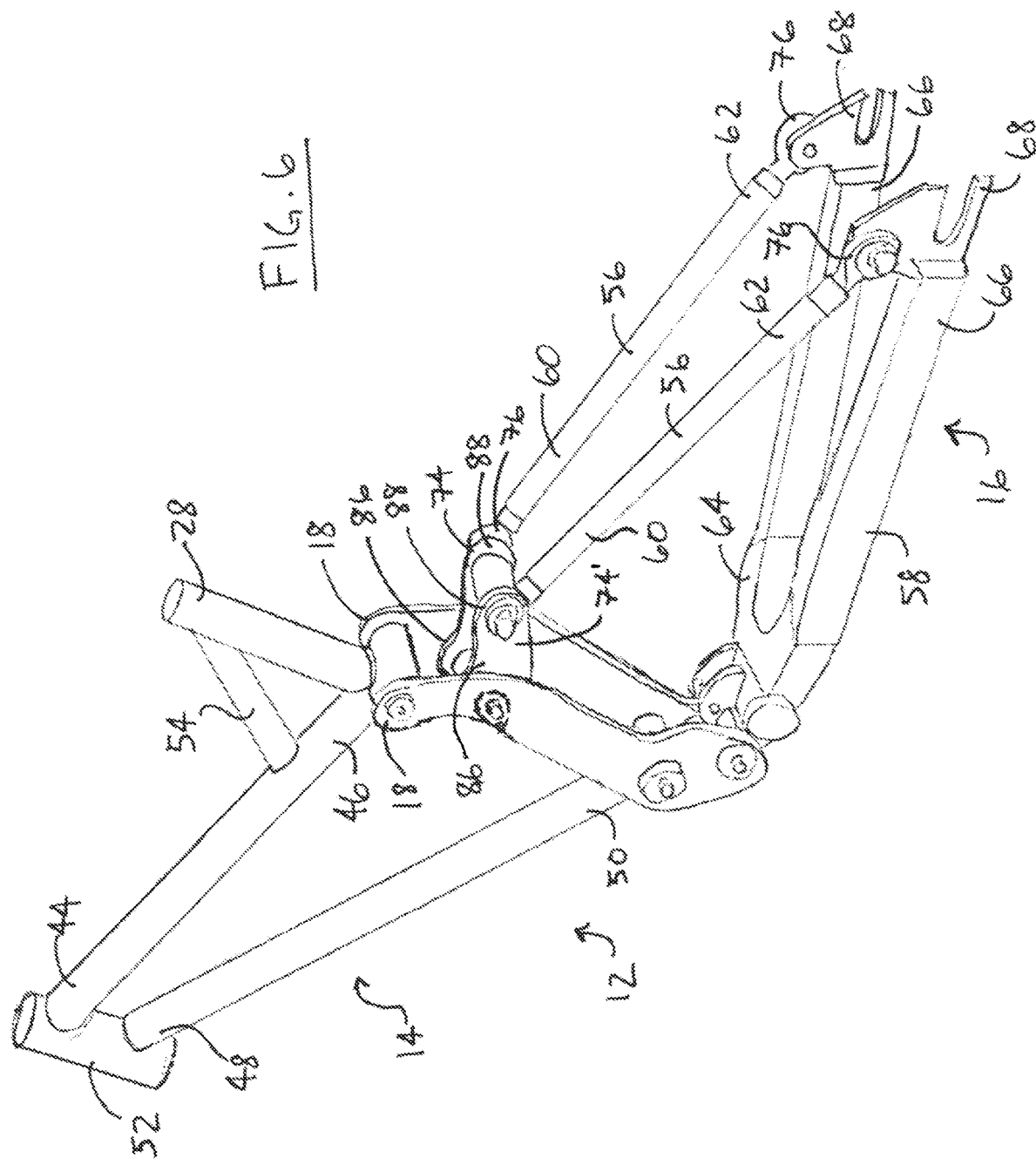
FIG. 6 is a perspective view of a bicycle frame assembly according to one aspect of the present invention.
Figure 7:
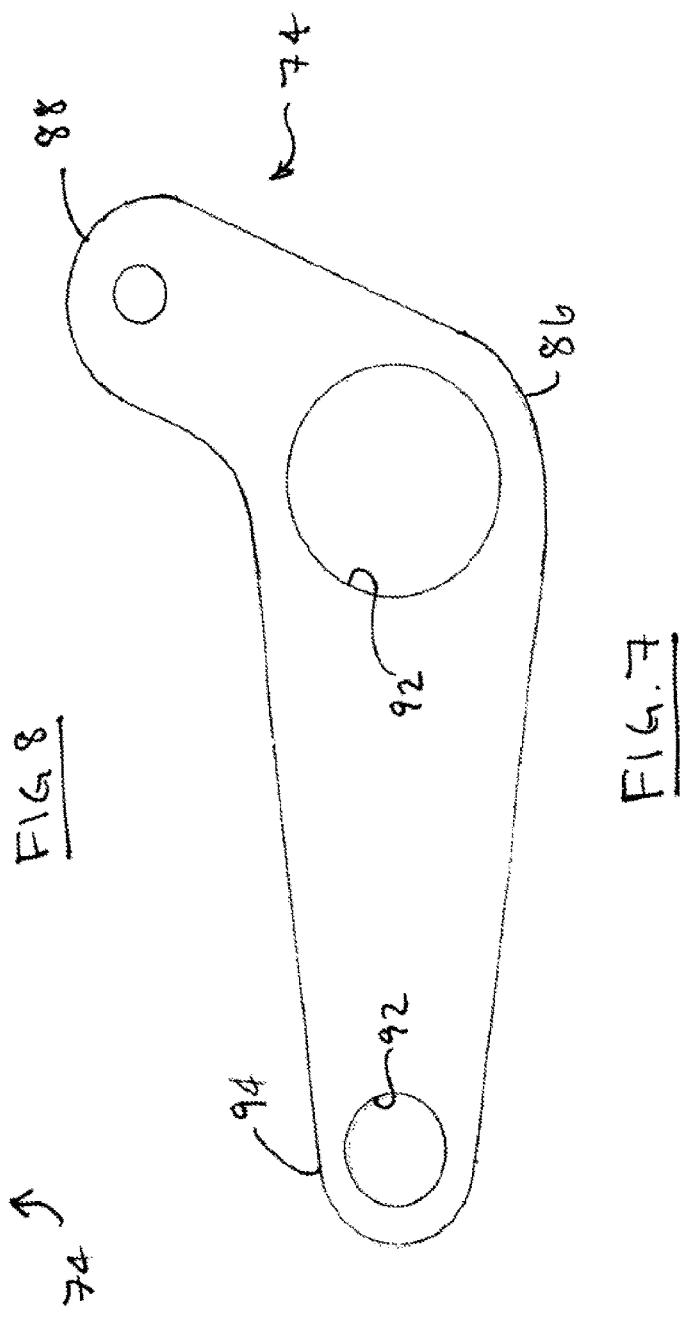
FIG. 7 is a side view of a linking member.

In another aspect, as shown in FIGS. 1, 2 and 6 and as shown in further detail in FIG. 7, the bicycle frame assembly 12 may further include at least one linking member 74 (FIGS. 1 and 2) or 74' (FIG. 6) extending between the at least one junction member 18 and the at least one upper rear frame support member 56 for coupling the at least one upper rear frame support member 56 with the at least one junction member 18. The at least one linking member 74 or 74' couples the at least one upper rear frame support member 56 with the at least one junction member 18 preferably generally between the upper frame member coupling end portion 78 and the lower frame member coupling end portion 80 of junction member 18.

Figure 8:
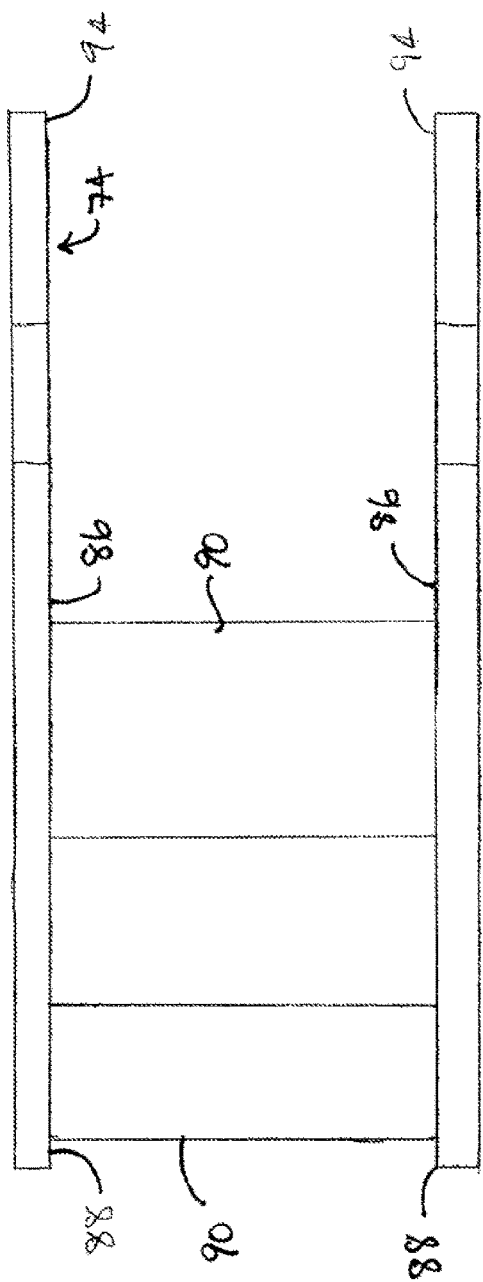
FIG. 8 is a top view of a linking member.

The at least one linking member 74 (FIGS. 1 and 2) or 74' (FIG. 6) may be integrally formed as a monolithic component, but preferably includes a pair of linking members 74 or 74' having at least one coupling 90 extending therebetween (FIG. 8). At least one coupling 90 may, for example, include a threaded or non-threaded passage 92 (FIG. 7) extending therethrough for allowing the passage of a fastener such as a bolt (not shown). Each linking member 74 or 74' of the pair of linking members 74 or 74' has a body portion 86 and a first end portion 88 extending from the body portion 86. The pair of upper rear frame support members 56 is coupled with the first end portion 88 of respective ones of the pair of linking members 74 or 74'. Each of the linking members 74 or 74' of the pair of linking members 74 or 74' is coupled with a respective one of the junction members 18 of the pair of junction members 18 at the body portion 86 thereof.

In the aspect shown in FIG. 6, the body portions 86 of the pair of linking members 74' are non-pivotably coupled with the respective ones of the junction members 18 of the pair of junction members 18. Similarly, the first end portions 88 of the pair of linking members 74' are non-pivotably coupled with the respective ones of the upper rear frame support members 56 and the first end portion 64 of the lower rear frame support member 58 is non-pivotably coupled with the lower frame member coupling end portion 80 of the pair of junction members 18. Thereby, there is provided rigid, non-pivotable coupling of the rear frame portion 16 with the at least one junction member 18 in a manner similar to that of FIG. 4 but with the inclusion of a linking member 74' as in FIG. 6.

In another aspect, as shown in FIGS. 2, 7 and 8, the linking member 74 may further include a second end portion 94 that extends from the body portion 86 away from the first end portion 88. In this configuration, the linking member 74 may be referred to as a "rocker arm". Coupled with the second end portions 94 of the pair of linking members 74 may be a suspension assembly 96 as shown in FIG. 9. Suspension assembly 96 extends from the second end portions 94 of the pair of linking members 74 to the first end portion 64 of lower rear frame support member 58 and is removably coupled therewith. It should be understood, however, that the suspension assembly 96 may extend from the second end portions 94 of the pair of linking members 74 for coupling with any suitable portion of the front frame portion 14 or the rear frame portion 16, including upper or lower members of the front frame portion 14 or of the rear frame portion 16. For example, the suspension assembly 96 may couple with the second end portion 50 of the lower front frame support member 42 rather than the first end portion 64 of the lower rear frame support member 58 or may be positioned therebetween. In this aspect, the body portions 86 of the pair of linking members 74 are preferably pivotably coupled with the respective ones of the pair of junction members 18. Moreover, the first end portions 88 of the pair of linking members 74 are pivotably coupled with the respective ones of the upper rear frame support members 56 and the first end portion 64 of the lower rear frame support member 58 is pivotably coupled with the lower frame member coupling end portion 80 of the pair of junction members 18. The linking member 74 may thereby allow for relative movement between the rear frame portion 16 and the at least one junction member 18. Accordingly, forces acting on the rear frame portion 16 may be transferred to the suspension assembly 96 by way of the linking member 74.

It should be understood that the coupling between the at least one junction member 18 and the at least one upper rear frame support member 56, between the at least one junction member 18 and the at least one lower rear frame support member 58, between the at least one junction member 18 and the upper front frame support member 40, between the at least one junction member 18 and the lower front frame support member 40, between the first end portion 88 of the linking member 74 or 74' and the at least one upper rear frame support member 56 and between the body portion 86 of linking member 74 or 74' and junction member 18 are preferably removable couplings. Thereby, the front frame portion 14 and the rear frame portion 16 may be removed and exchanged with a front frame portion 14 or rear frame portion 16 having a different geometry. Therefore, the bicycle frame assembly 12 may be adapted to accommodate different biomechanical conditions associated with different users or associated with the same user over time as their body changes in size or weight. Moreover, the at least one junction member 18 may be removed from the bicycle frame assembly 12 for repair or replacement. Further, the bicycle frame assembly 12 may be suitably adapted for use with a suspension assembly 96 or without a suspension assembly 96. This is particularly useful when a portion of the bicycle 10 is damaged and needs to be repaired or the frame portion of a different geometry needs to be assembled to the bicycle frame assembly 12. The above advantages can be achieved without replacing the whole frame assembly, but by only removing the frame portion or portions that are in need of replacement.

Where components are coupled together by means of a "tongue-in-slot" type coupling, the components may be decoupled with or without the use of a separate tool for removing a fastener therebetween thereby further simplifying the process for removal or replacement.

In accordance with the above, there is thereby provided a bicycle assembly which is preferably modular in its construction. It should be understood that the front frame assembly, the rear frame assembly and the junction member may be fabricated from any suitable material. Moreover, the coupling between components described herein may be achieved by any suitable means such as, for example, by way of mechanical fasteners or a tongue and receiving slot engagement. By providing a structural coupling between the front assembly and the rear assembly, the junction member provides for a modular design of the bicycle assembly which allows the bicycle assembly to be altered for different ergonomic, economic and performance purposes.

While there have been described herein what are considered to be preferred and exemplary aspects of the present invention, other modifications of the invention shall be apparent to those skilled in the art from the teachings herein and, it is therefore desired to be secured in the appended claims all such modifications as fall within the scope of the invention.

What is claimed is:

1. A bicycle assembly comprising:
a front frame portion having at least one front frame support member;
a rear frame portion having at least one upper rear frame support member and at least one lower rear frame support member; and,
a pair of junction members each removably coupled with the at least one front frame support member, the pair of junction members each having a lower frame member coupling end portion and an upper frame member coupling end portion, wherein the at least one lower rear frame support member is removably coupled with the lower frame member coupling end portion of each junction member of the pair of junction members and wherein the at least one upper rear frame support member is removably coupled with each junction member of the pair of junction members between the lower frame member coupling end portions thereof and the upper frame member coupling end portions thereof.

2. The bicycle assembly of claim 1, wherein the at least one front frame support member includes at least one upper front frame support member coupled with the upper frame member coupling end portion of each junction member of the pair of junction members and at least one lower front frame support member coupled with the lower frame member coupling end portion of each junction member of the pair of junction members.

3. The bicycle assembly of claim 1, wherein the at least one upper rear frame support member includes a pair of upper rear frame support members.

4. The bicycle assembly of claim 3, wherein each upper rear frame support member of the pair of upper rear frame support members is an extendable strut.

5. The bicycle assembly of claim 1, wherein the at least one upper rear frame support member is directly coupled with each junction member of the pair of junction members.

6. The bicycle assembly of claim 5, wherein the at least one upper rear frame support member is non-pivotably coupled with each junction member of the pair of junction members.

7. The bicycle assembly of claim 1 further comprising:
at least one linking member having a body portion and a first end portion extending from the body portion, the first end portion coupled with an end portion of the at least one upper rear frame support member and the body portion of the at least one linking member coupled with the pair of junction members.

8. The bicycle assembly of claim 7, wherein the pair of junction members is non-pivotably coupled with the body portion of the at least one linking member and the at least one lower rear frame support member.

9. The bicycle assembly of claim 1 further comprising:
at least one linking member having a body portion, a first end portion extending from the body portion and a second end portion extending from the body portion away from the first end portion; wherein,
the first end portion is pivotably coupled with an end portion of the upper rear frame support member and the body portion of the at least one linking member is pivotably coupled with the pair of junction members; and,
the at least one lower rear frame support member is pivotably coupled with the pair of junction members.

10. The bicycle assembly of claim 9, further comprising:
a suspension assembly extending between the second end portion of the at least one linking member and at least one of the front frame portion, the rear frame portion and the lower frame member coupling end portion of each junction member of the pair of junction members.

11. The bicycle assembly of claim 10, wherein the suspension assembly extends between the second end portion of the at least one linking member and at least one of an upper front frame support member end portion, a lower front frame support member end portion, an upper rear frame support member end portion, a lower rear frame support member end portion and the lower frame member coupling end portion of each junction member of the pair of junction members.

12. The bicycle assembly of claim 1, wherein one of the at least one lower rear frame support member and the junction members of the pair of junction members sandwiches the other one of the lower rear frame support member and the junction members of the pair of junction members.

13. The bicycle assembly of claim 2, wherein the at least one junction member further comprises:
the upper frame member coupling end portion of each junction member of the pair of junction members is removably coupled with the at least one upper front frame support member wherein one of the at least one upper front frame support member and the upper frame member coupling end portions of the pair of junction members sandwiches the other one of the at least one upper front frame support member and the upper frame member coupling end portions of the pair of junction members; and,
the lower frame member coupling end portion of each junction member of the pair of junction members is removably coupled with the at least one lower front frame support member wherein one of the at least one lower front frame support member and the lower frame member coupling end portions of the pair of junction members sandwiches the other one of the at least one lower front frame support member and the lower frame member coupling end portions of the pair of junction members.

14. The bicycle assembly of claim 12, wherein:
the lower frame member coupling end portion of each junction member of the pair of junction members is coupled with the at least one lower rear frame support member wherein one of the lower frame member coupling end portion and the at least one lower rear frame support member sandwiches the other one of the lower frame member coupling end portion and the at least one lower rear frame support member.

15. The bicycle assembly of claim 14, wherein:
the lower frame member coupling end portion of each junction member of the pair of junction members is coupled with the at least one lower rear frame support member to sandwich the at least one lower rear frame support member between the lower frame member coupling end portions of the junction members of the pair of junction members.

16. The bicycle assembly of claim 12, further comprising:
a pair of linking members each having a body portion pivotably coupled with a respective junction member of the pair of junction members, a first end portion extending from the body portion and a second end portion extending from the body portion away from the first end portion;
a pair of upper rear frame support members each pivotably coupled with the first end portion of a respective linking member of the pair of the linking members; and,
the at least one lower rear frame support member is pivotably coupled with the pair of junction members.

17. The bicycle assembly of claim 13, further comprising:
a pair of linking members each having a body portion pivotably coupled with a respective junction member of the pair of junction members, a first end portion extending from the body portion and a second end portion extending from the body portion away from the first end portion;
a pair of upper rear frame support members each pivotably coupled with the first end portion of a respective linking member of the pair of the linking members; and,
the at least one lower rear frame support member is pivotably coupled with the at least one junction member.

18. The bicycle assembly of claim 16 further comprising:
a suspension assembly extending from the second end portions of the pair of linking members to at least one of the front frame portion, the rear frame portion and the lower frame member coupling end portion of each junction member of the pair of junction members.

19. The bicycle assembly of claim 18 wherein the suspension assembly extends between the second end portions of the pair of linking members and at least one of an upper front frame support member end portion, a lower front frame support member end portion, an upper rear frame support member end portion, a lower rear frame support member end portion and the lower frame member coupling end portion of each junction member of the pair of junction members.

20. A junction member assembly comprising:
a pair of junction members each having an upper frame member coupling end portion and a lower frame member coupling end portion, wherein at least one front frame support member of a bicycle frame front frame portion is removably couplable with at least one of the upper frame member coupling end portion and the lower frame member coupling end portion of each junction member of the pair of junction members, at least one lower rear frame support member of a bicycle frame rear frame portion is removably couplable with the lower frame member coupling end portion of each junction member of the pair of junction members, and at least one upper rear frame support member of the bicycle frame rear frame portion is removably couplable with of each junction member of the pair of junction members between the upper frame member coupling end portions thereof and the lower frame member coupling end portions thereof.

21. The junction member assembly of claim 20, wherein:
the lower frame member coupling end portion of each junction member of the pair of junction members is removably couplable with at least one lower front frame support member of a bicycle frame front frame portion; and,
the upper frame member coupling end portion of each junction member of the pair of junction members is removably couplable with at least one upper front frame support member of a bicycle frame front frame portion.

22. A bicycle frame rear frame portion comprising:
at least one upper rear frame support member having a first end portion for removable coupling with a coupling portion of a pair of junction members of a bicycle frame assembly between an upper frame member coupling end portion of each junction member of the pair of junction members and a lower frame member coupling end portion of each junction member of the pair of junction members; and,
at least one lower rear frame support member having a second end portion for removable coupling with the lower frame member coupling end portion of each junction member of the pair of junction members of the bicycle frame assembly.

23. The bicycle rear frame portion of claim 22, wherein the first end portion of the at least one upper rear frame support member is for removable coupling with an end portion of a linking member for extending between the first end portion of the at least one upper rear frame support member and the upper frame member coupling end portion of each junction member of the pair of junction members of the bicycle frame assembly.

24. The bicycle rear frame portion of claim 23, wherein the second end portion of the lower rear frame support member is for pivotable coupling with the lower frame member coupling end portion of each junction member of the pair of junction members of the bicycle frame assembly.

* * * * *